United States Patent
Noda

(10) Patent No.: US 7,039,550 B2
(45) Date of Patent: May 2, 2006

(54) SURFACE SCAN MEASURING INSTRUMENT, SURFACE SCAN MEASURING METHOD, SURFACE SCAN MEASURING PROGRAM AND RECORDING MEDIUM

(75) Inventor: Takashi Noda, Utsunomiya (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 10/865,720

(22) Filed: Jun. 10, 2004

(65) Prior Publication Data

US 2004/0260509 A1    Dec. 23, 2004

(30) Foreign Application Priority Data

Jun. 17, 2003   (JP)   ............................. 2003-171798

(51) Int. Cl.
*G01B 5/20* (2006.01)
*G01B 15/04* (2006.01)
*G01B 21/20* (2006.01)
*G06F 15/00* (2006.01)

(52) U.S. Cl. ..................................... 702/168; 702/167

(58) Field of Classification Search ................. 33/503, 33/505, 555, 556; 73/1.79, 1.81, 105, 1.89; 702/94, 95, 127, 150, 155, 158, 166, 168, 702/FOR. 147, 167; 356/489
See application file for complete search history.

(56) References Cited

U.S. PATENT DOCUMENTS

| | | | | |
|---|---|---|---|---|
| 5,189,806 A | * | 3/1993 | McMurtry et al. | ............. 33/503 |
| 5,289,004 A | * | 2/1994 | Okada et al. | ................ 250/306 |
| 5,737,244 A | | 4/1998 | Ruck | |
| 6,158,136 A | * | 12/2000 | Gotz et al. | ..................... 33/503 |
| 6,877,365 B1 | * | 4/2005 | Watanabe et al. | ............. 73/105 |
| 2005/0172703 A1 | * | 8/2005 | Kley | ........................... 73/105 |

FOREIGN PATENT DOCUMENTS

| | | |
|---|---|---|
| EP | 0 902 345 A2 | 3/1999 |
| JP | 2791030 | 6/1998 |
| JP | 2000-74661 | 3/2000 |

\* cited by examiner

*Primary Examiner*—Bryan Bui
*Assistant Examiner*—Douglas N. Washburn
(74) *Attorney, Agent, or Firm*—Rankin, Hill, Porter & Clark LLP

(57) ABSTRACT

A surface scan measuring instrument is provided with: a scanning probe (2) that has a probe sensor (24) for detecting a relative position of a measurement point and a workpiece and scans a workpiece surface; a drive mechanism (12) for moving the scanning probe (2); a joystick (32) for inputting an instruction of a direction and a size with a manual operation; a moving vector commander (43) that generates a moving vector having the direction and the size instructed by the joystick (32); an retraction vector commander (51) that automatically generates a retraction vector for commanding a movement in a retraction direction based on a value detected by the probe sensor (24); a scanning vector commander (44) that generates a scanning vector by combining the moving vector and the retraction vector; and a drive control circuit (45) for controlling a drive of the drive mechanism (12) according to the scanning vector.

8 Claims, 11 Drawing Sheets

SURFACE SCAN MEASURING INSTRUMENT, SURFACE SCAN MEASURING METHOD, SURFACE SCAN MEASURING PROGRAM AND RECORDING MEDIUM

BACKGROUND OF THE INVENTION

1. Field of the Invention

The present invention relates to a surface scan measuring instrument, a surface scan measuring method, a surface scan measuring program and a recording medium storing the program. More specifically, for instance, it relates to a surface scan measuring instrument or the like that scans a surface of a workpiece for measuring a surface roughness, a waviness and a contour of the workpiece.

2. Description of Related Art

Conventionally, a roughness measuring machine, a contour measuring machine, a roundness measuring machine, a coordinate measuring machine and the like have been know as a measuring machine that scans a surface of a workpiece with a scanning probe for measuring a surface texture and a three dimensional profile of the workpiece (see a reference: Japanese Patent Laid-Open Publication No. 2000-74661, for instance).

FIG. 11 shows a measuring system 100 using a coordinate measuring machine 1. The measuring system 100 includes a coordinate measuring machine 1 for moving a scanning probe 2, a manually-operated joystick 32, a motion controller 4 for controlling a motion of the coordinate measuring machine 1, and a host computer 5 for operating the coordinate measuring machine 1 thorough the motion controller 4 and for processing a measurement data obtained by the coordinate measuring machine 1 to find a dimension and a form etc. of a workpiece W. In a scan measurement, since a measurement condition should be set, a surface profile data is input as the measurement condition. The surface profile data may be a design data used for designing the workpiece, a measurement data of obtained by measuring a master workpiece and the like. In addition, a scan route, a scan movement speed, a reference retraction of the probe and a sampling pitch are set. As the scan route to be set may be, for instance, a route for a scan measurement of a contour of the workpiece W on a particular cross section with a certain Z-axis coordinate.

To start the measurement, firstly, the scanning probe 2 is moved to a measurement start point. For moving the scanning probe 2 to the measurement start point, coordinates of the measurement start point may be input, or the joystick 32 may be operated. Then, the motion controller 4 outputs a command signal to the coordinate measuring machine 1 to command a movement of the scanning probe 2, so that the scanning probe 2 scans the workpiece surface. In other words, according to the input surface profile data, a command of a scan direction to have the scanning probe 2 move and scan on the workpiece surface while keeping a certain retraction is given to the coordinate measuring machine 1. Then the scanning probe 2 moves toward the commanded scan direction at the set scan speed. During this process, a measurement data is obtained at a predetermined sampling pitch, so that the workpiece W is measured by scanning.

In the scan measurement, the surface profile data of the workpiece and the scan route should be set in advance of the measurement. When, for example, a measurement with a scan route is followed by another measurement with a different scan route, the scan route should be newly set and input. This takes a good deal of time and efforts, and lowers the measurement efficiency. Also, since the setting is a time-consuming work, operators might feel that the measurement is troublesome.

If the movement of the scanning probe 2 can be controlled using the joystick 32, it will be convenient because the operators can freely select the scan route and the scan speed depending on the condition to operate the scanning probe 2. However, since the scanning probe 2 includes a high-sensitivity sensor that detects a slight displacement caused when abutting on the workpiece W, the scanning probe 2 might be damaged if the scanning probe 2 abuts on the workpiece W with a force greater than an allowable value. For instance, an accuracy around 0.5 mm is required as the allowable value of a probe retraction. With this configuration, it is impossible to manually operate the scanning probe 2 while keeping the scanning probe 2 in contact with the workpiece W.

SUMMARY OF THE INVENTION

An object of the present invention is to provide a surface scan measuring instrument and a surface scan measuring method with a scanning probe that can be manually operated during a scan measurement.

A surface scan measuring instrument according to one aspect of the present invention includes: a scanning probe that has a measurement point for approaching or contacting a workpiece surface and a detection sensor for detecting a relative position of the measurement point and the workpiece surface along a normal direction of the workpiece surface, the scanning probe scanning the workpiece surface while keeping the relative position of the measurement point and the workpiece at a preset reference position; a moving unit for moving the scanning probe; an operation unit that has a manual operation member for instructing an input of a desired direction and a desired size with a manual operation; an instruction vector commander that generates an instruction vector having the direction and the size instructed by the manual operation member within a predetermined limited processing time from the input instruction; a relative vector commander that automatically generates a relative vector having a size of a deviation of the relative position of the measurement point and the workpiece surface relative to the reference position and a direction of the normal direction of the workpiece surface based on a value detected by the detection sensor; a scanning vector commander that generates a scanning vector by combining the instruction vector and the relative vector; and a drive controller for controlling a drive of the moving unit according to the scanning vector.

With this configuration, for moving the scanning probe, an operator manually operates the manual operation member to input the desired direction and the desired size. Then, the instruction vector commander generates the instruction vector having the instructed direction and the instructed size within a predetermined limited processing time, for example within an instant.

In the meantime, when the measurement point scans the workpiece surface, the detection sensor detects the relative position of the measurement point and the workpiece surface (or, in the case of a contact type scanning probe, the position of the measurement point retracted into the workpiece surface). If the relative position detected by the detection sensor is deviated from the preset reference position, the relative vector generator generates the relative vector having the size corresponding to the deviation and the normal direction of the workpiece surface. Then, the scanning vector commander generates the scanning vector by combining the instruction vector corresponding to the instruction with the manual operation and the relative vector generated based on the value detected by the detection sensor. The drive controller applies a drive control signal corresponding to the scanning vector to the moving unit, and the moving unit moves the scanning probe to scan along the workpiece surface. The workpiece can be measured by sampling the coordinates of the measurement point at a predetermined sampling pitch.

The direction and the size can be instructed by the manual operation member, and the instruction vector is generated according to the instruction. Accordingly, the operator can move the scanning probe in the desired direction and at the desired speed. Further, the movement in the normal direction of the workpiece surface is controlled by a command from the relative vector commander based on the value detected by the detection sensor. That is, the relative vector toward the normal direction of the workpiece surface is automatically generated depending on the deviation from the reference position, so that the scanning probe is moved according to the scanning vector that is a combination of the relative vector and the instruction vector.

Since the reference position of the measurement point and the workpiece surface requires a slight distance control, it is impossible to manually control the distance. In view of that, by automatically generating the relative vector without manual operation, the relative position of the measurement point and the workpiece surface is automatically controlled without the operation of the operator. This prevents an accident such as a damage of the scanning probe caused when the measurement point abuts the workpiece with a large force. When the operator commands the direction for a measurement and a speed during the measurement, the scan is performed with the automatically controlled relative position of the measurement point and the workpiece surface.

Since there is no need to input a profile data etc. of the workpiece in advance of starting the scan measurement, the measurement can be easily started. Also, since a measurement can be smoothly followed by another measurement, the measurement can be immediately started even when the workpiece is replaced. Consequently, the measurement can be easily performed without troublesome work, considerably shortening the time required for the measurement. Since, for example, the movement of the scanning probe is suspended by setting the speed command at zero, the timing to start or to suspend the measurement can be freely adjusted.

Herein, it is preferable that the instruction vector commander includes an instruction unit vector commander that generates a unit vector having the direction instructed by the operation unit, an instruction moving speed commander that generates a moving speed for moving the scanning probe based on the size instructed by the operation unit, and an instruction vector generator that generates the instruction vector by combining the unit vector having the instructed direction and the moving speed.

It is also preferable that the relative vector commander includes a relative unit vector calculator that calculates a unit vector having the normal direction of the workpiece surface based on the value detected by the detection sensor, a relative deviation calculator that calculates a relative deviation, which is the deviation of the relative position of the measurement point and the workpiece surface relative to the reference position, based on the value detected by the detection sensor, and a relative vector generator that combines the unit vector having the normal direction calculated by the relative unit vector calculator and the relative deviation calculated by the relative deviation calculator.

In the above-described surface scan measuring instrument according to the present invention, it is preferable that: the moving unit has drive axes in mutually orthogonal three directions and slide members respectively provided on the drive axes and slidable along the drive axes; the surface scan measuring instrument has a coordinate system setting section in which a machine coordinate system having an Xm-axis, a Ym-axis and a Zm-axis in directions of the respective drive axes, and a work coordinate system having an Xw-axis, a Yw-axis mutually orthogonal within a plane defined by a desired surface of the workpiece and a Zw-axis perpendicular to the plane are set; the operation unit has a coordinate system selector for selecting either one of the machine coordinate system or the work coordinate system with a manual operation; an instruction direction of the manual operation member is defined according to the either one of the machine coordinate system or the work coordinate system selected by the coordinate system selector while the instruction vector commander generates the instruction vector according to the selected coordinate system; and the scanning vector commander includes a coordinate system converter for converting the machine coordinate system and the work coordinate system into one another.

In this configuration, the machine coordinate system defined by the drive axis of the moving unit and the work coordinate system defined by the workpiece are set in the coordinate system setting section, and either one of the coordinate system to be used during the manual operation with the manual operation unit is selected by the coordinate system selector. The instruction vector commander recognizes the command from the manual operation unit according to the selected coordinate system and generates the instruction vector. If the work coordinate system is selected, the scanning vector commander converts the coordinate system of the scanning vector into the machine coordinate system by the coordinate system converter. The scanning vector converted in the machine coordinate system is applied to the moving unit by the drive controller, so that the moving unit is driven.

Since the work coordinate system defined by the workpiece is set, it is easy to intuitively recognize a direction when the operator instructs a direction such as the direction to scan the workpiece with a manual operation. For controlling the drive of the moving unit, the instruction based on the machine coordinate system, which is the coordinate system with the drive axis directions of the moving unit, should be given. Therefore, the coordinate system converter converts the coordinate system into the machine coordinate system, so that the moving unit can be efficiently controlled based on the machine coordinate system with the drive axes.

In the above-described surface scan measuring instrument according to the present invention, it is also preferable that the operation unit has an axis selector for selecting any one of three axes of either the machine coordinate system or the work coordinate system with a manual operation, and that the instruction vector commander generates the instruction vector within a plane perpendicular to the axis selected by the axis selector while fixing coordinates of the selected axis.

With this configuration, when one axis is selected by the axis selector, the instruction vector commander fixes the coordinates of the selected axis. In other words, the movement of the scanning probe along a direction of the selected axis is restricted. For instance, when an x-axis is fixed, the movement of the scanning probe is restricted within a plane parallel to a yz-plane. In this condition, the cross-sectional profile on the plane parallel to the yz-plane with a desired x coordinate is measured by scanning. Although it is difficult to accurately instruct one direction with a manual operation, the movement of the scanning probe along the desired axis can be restricted, and the cross-sectional profile within the plane can be accurately measured.

In the above-described surface scan measuring instrument according to the present invention, it is preferable that the manual operation unit has a swingable joystick, and that the operation unit includes an inclination angle detector for detecting an inclination angle and an inclination direction of the joystick.

With this configuration, when the joystick is inclined in a desired direction, the inclination angle detector detects the direction and the degree of the inclination of the joystick. When the detected value is output to the instruction vector commander, the instruction vector having the inclined direction and the inclined angle is generated.

Since the direction for moving the scanning probe can be instructed by inclining the joystick, and the size can be instructed by the angle of the inclination of the joystick, the instruction of the direction and the size are intuitively recognizable and it is easy to use.

The manual operation member may be any device capable of instructing a direction and a size including a cursor key and a track ball.

A surface scan measuring instrument according to another aspect of the present invention includes: a scanning probe that has a measurement point for approaching or contacting a workpiece surface and a detection sensor for detecting a relative position of the measurement point and the workpiece surface along a normal direction of the workpiece surface, the scanning probe scanning the workpiece surface while keeping the relative position of the measurement point and the workpiece at a preset reference position; a moving unit for moving the scanning probe; an operation unit that has a manual operation member for instructing an input of a desired size with a manual operation; a storage for storing a predetermined route to be scanned in advance; an instruction vector commander that generates an instruction vector having the size instructed by the manual operation member and a direction along the predetermined route; a relative vector commander that automatically generates a relative vector having a size of a deviation of the relative position of the measurement point and the workpiece surface relative to the reference position and a direction of the normal direction of the workpiece surface based on a value detected by the detection sensor; a scanning vector commander that generates a scanning vector by combining the instruction vector and the relative vector; and a drive controller for controlling a drive of the moving unit according to the scanning vector.

With this configuration, for moving the scanning probe, the operator manually operates the manual operation member to input the desired size. Then, the instruction vector commander generates the instruction vector having the direction along the predetermined route stored in the storage and the instructed size within a predetermined limited processing time, for example within an instant.

In the meantime, the detection sensor detects the relative position of the measurement point and the workpiece surface, and the relative vector generator generates the relative vector having the size of the deviation of the relative position from the reference position and the direction of the normal direction of the workpiece surface. The scanning vector commander generates the scanning vector by combining the instruction vector corresponding to the instruction with the manual operation and the relative vector generated based on the value detected by the detection sensor. The drive controller applies a drive control signal corresponding to the scanning vector to the moving unit, and the moving unit moves the scanning probe to scan along the workpiece surface. The coordinates of the measurement point are sampled at a predetermined sampling pitch, so that the workpiece is measured.

The size can be instructed by the manual operation member, and the instruction vector having the size according to the instruction is generated. Accordingly, the operator can move the scanning probe at the desired speed. Consequently, the operator can freely adjust the movement speed to adjust the time required for the measurement.

The movement direction is automatically controlled according to the predetermined route input in advance and the value detected by the detection sensor. Accordingly, even in the case that there is a difficulty to instruct the direction with a manual operation, for example in the case of a thread groove or an inner circumference of a cylinder, an accurate scan measurement can be performed.

According to the present invention, a surface scan measuring method performs a scan measurement of a workpiece surface by moving a scanning probe by a moving unit, wherein the scanning probe has a measurement point for approaching or contacting a workpiece surface and a detection sensor for detecting a relative position of the measurement point and the workpiece surface along a normal direction of the workpiece surface, the scanning probe scanning the workpiece surface while keeping the relative position of the measurement point and the workpiece at a preset reference position, and the surface scan measuring method includes: a manual operation step of instructing an input of a desired direction and a desired size with a manual operation; an instruction vector commanding step of generating an instruction vector having the direction and the size instructed by the manual operation step within a predetermined limited processing time from the input instruction; a relative vector commanding step of automatically generating a relative vector having a size of a deviation of the relative position of the measurement point and the workpiece surface relative to the reference position and a direction of the normal direction of the workpiece surface based on a value detected by the detection sensor; a scanning vector commanding step of generating a scanning vector by combining the instruction vector and the relative vector; and a drive controlling step of controlling a drive of the moving unit according to the scanning vector.

According to the present invention, a computer-readable surface scan measuring program operates a computer installed in a surface scan measuring instrument comprising: a scanning probe that has a measurement point for approaching or contacting a workpiece surface and a detection sensor for detecting a relative position of the measurement point and the workpiece surface along a normal direction of the workpiece surface, the scanning probe scanning the workpiece surface while keeping the relative position of the measurement point and the workpiece at a preset reference position; a moving unit for moving the scanning probe; and an operation unit that has an manual operation member for instructing an input of a desired direction and a desired size with a manual operation, and the surface scan measuring program operates the computer as: an instruction vector commander that generates an instruction vector having the direction and the size instructed by the manual operation member within a predetermined limited processing time from the input instruction; a relative vector commander that automatically generates a relative vector having a size of a deviation of the relative position of the measurement point and the workpiece surface relative to the reference position and a direction of the normal direction of the workpiece surface based on a value detected by the detection sensor; a scanning vector commander that generates a scanning vector by combining the instruction vector and the relative vector; and a drive controller for controlling a drive of the moving unit according to the scanning vector.

A computer-readable recording medium according to the present invention, stores a computer-readable surface scan measuring program for operating a computer installed in a surface scan measuring instrument including: a scanning probe that has a measurement point for approaching or contacting a workpiece surface and a detection sensor for detecting a relative position of the measurement point and the workpiece surface along a normal direction of the workpiece surface, the scanning probe scanning the workpiece surface while keeping the relative position of the measurement point and the workpiece at a preset reference position; a moving unit for moving the scanning probe; and an operation unit that has an manual operation member for instructing an input of a desired direction and a desired size with a manual operation, the surface scan measuring program operating the computer as: an instruction vector commander that generates an instruction vector having the direction and the size instructed by the manual operation member within a predetermined limited processing time from the input instruction; a relative vector commander that automatically generates a relative vector having a size of a deviation of the relative position of the measurement point and the workpiece surface relative to the reference position and a direction of the normal direction of the workpiece surface based on a value detected by the detection sensor; a scanning vector commander that generates a scanning vector by combining the instruction vector and the relative vector; and a drive controller for controlling a drive of the moving unit according to the scanning vector.

According to this configuration, the same advantages as the above-described surface scan measuring instrument of the present invention can be obtained. By installing a computer that has a CPU (a Central Processing Unit) and a memory (a storage) and arranging the program so that the computer works as respective units, the parameters of each unit can be easily changed. The program may be stored in a recording medium and be installed in a computer by directly inserting the recording medium to the computer, or alternatively, a reader device may be externally attached to the computer to install the program in the computer through the reader device. The program may be supplied and installed to the computer wirelessly or through a communication line such as the Internet, a LAN cable and a telephone line.

DETAILED DESCRIPTION OF PREFERRED EMBODIMENTS

Figure 1:
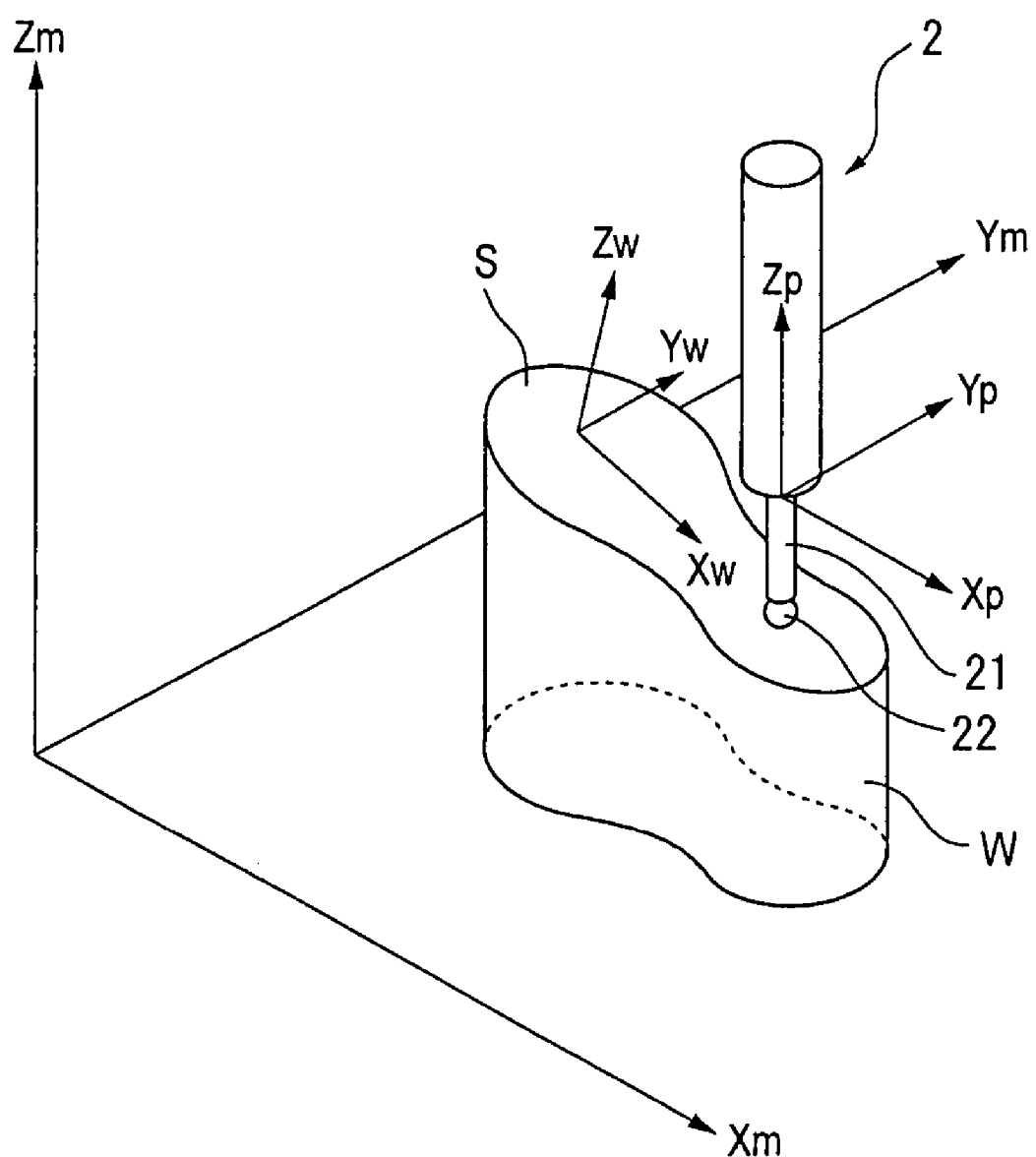
FIG. 1 is an illustration showing a relationship among a machine coordinate system, a work coordinate system and a probe coordinate system according to a first embodiment of the present invention.
Figure 2:
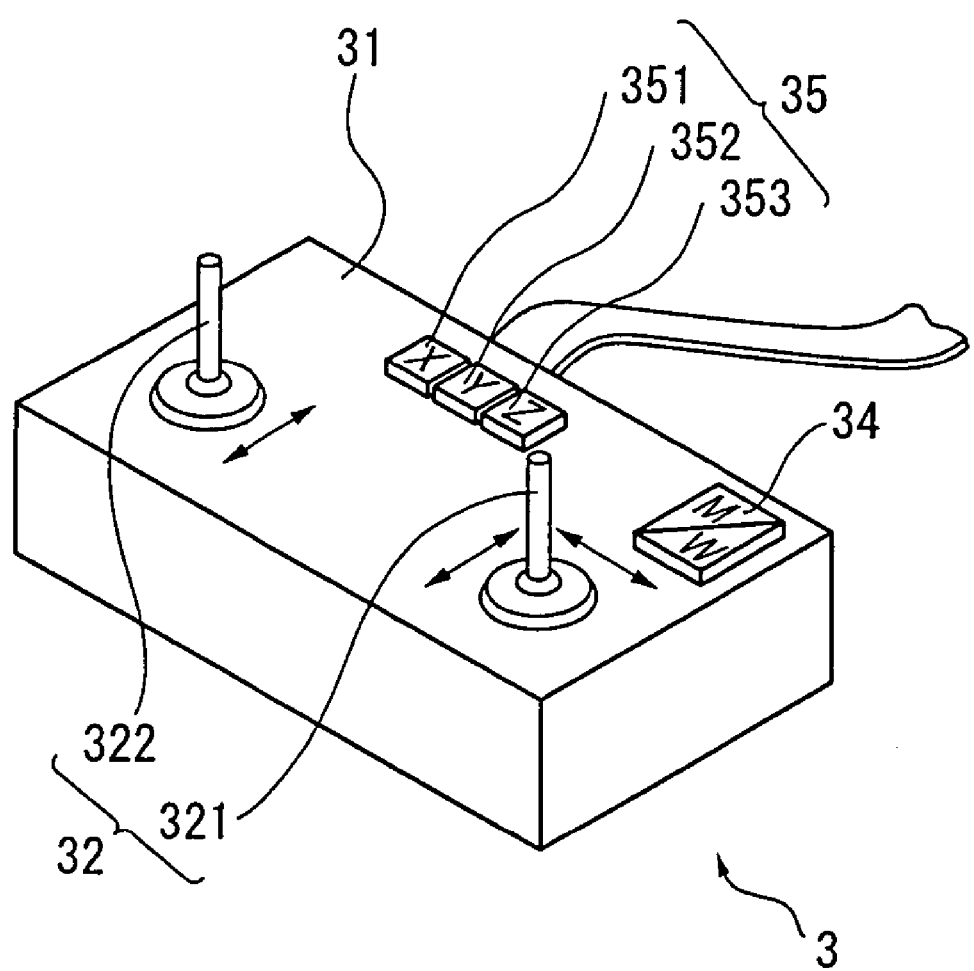
FIG. 2 is a perspective view showing an operation unit according to the first embodiment.

Embodiments of the present invention will be described below with reference to the attached drawings and the numerals and signs assigned to each elements shown in the drawings.

First Embodiment

[Configuration of Measuring System]

Figure 11:
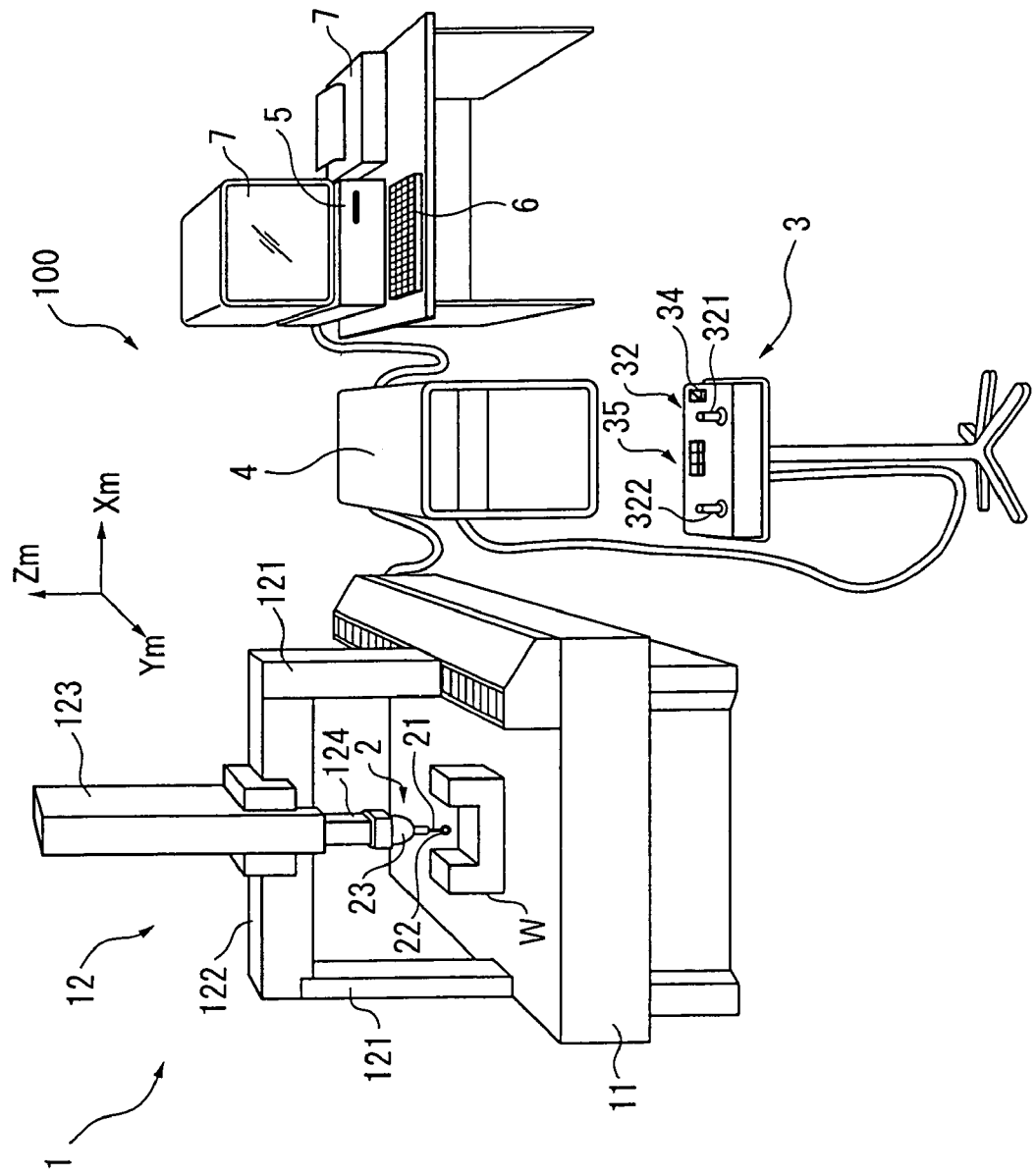
FIG. 11 is an illustration showing a configuration of a measuring system.

FIG. 11 shows a measuring system 100 as a surface scan measuring instrument using a coordinate measuring machine 1 according to a first embodiment of the present invention. The measuring system 100, which has a general configuration same as the configuration in the description of the related art, includes the coordinate measuring machine 1, an operation unit 3 for manually operating a motion of the coordinate measuring machine 1, a motion controller 4 for performing a drive control of the coordinate measuring machine 1, a host computer 5 for giving a predetermined command to the motion controller 4 and for performing a computational processing such as a form analysis of a workpiece, an input unit 6 for inputting a measurement condition, and an output unit 7 for outputting a measurement result.

Figure 3:
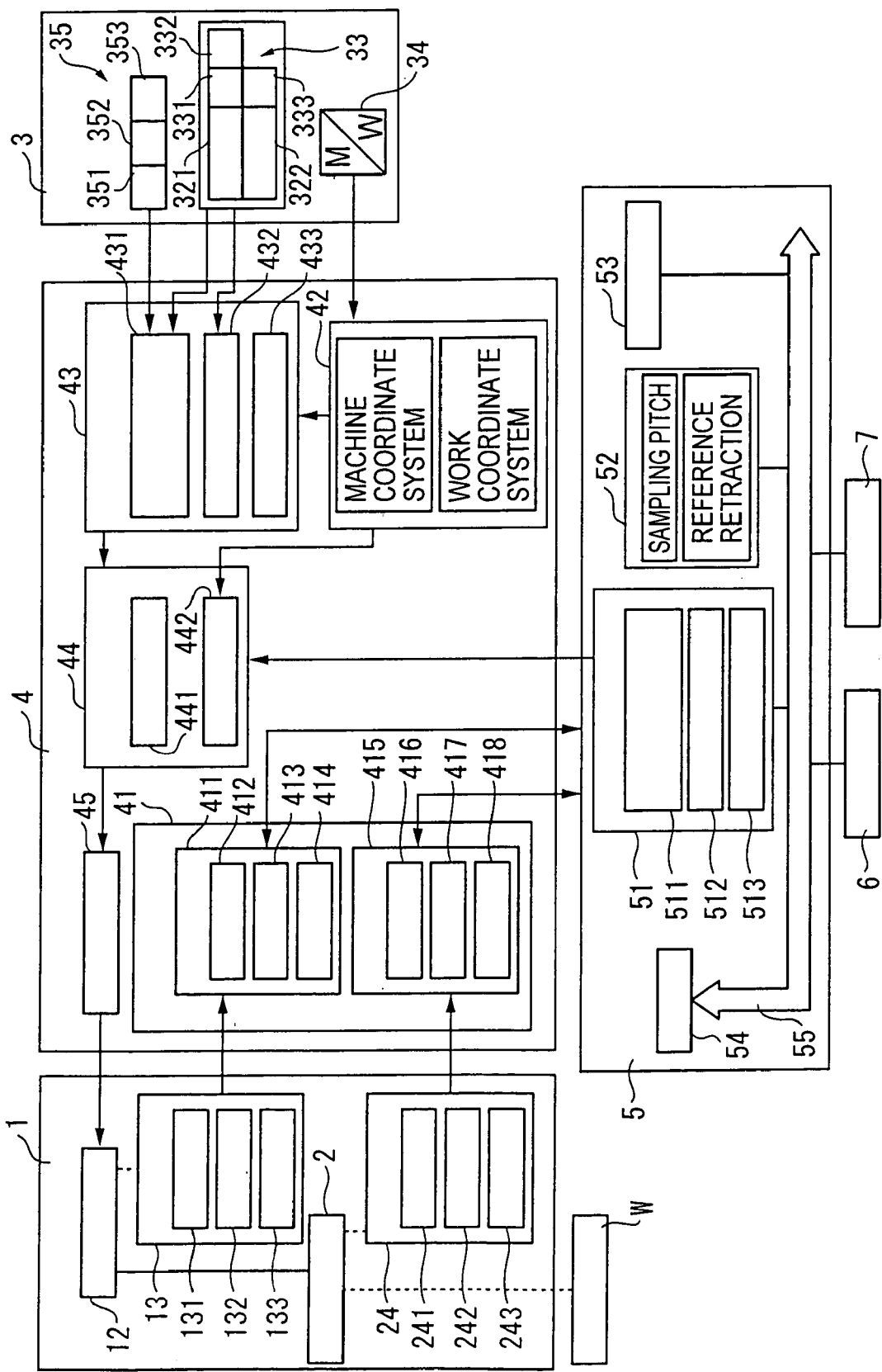
FIG. 3 is a block diagram showing functions of a measuring system according to the first embodiment.

The coordinate measuring machine 1 includes a base 11, a drive mechanism (a moving unit) 12 that is vertically mounted on the base 11 and moves a scanning probe 2 in three dimensions, and a drive sensor 13 (see FIG. 3) for detecting a drive distance of the drive mechanism 12.

The drive mechanism 12 includes two beam supporters 121 that are provided on both ends of the base 11 to have a height in a Zm direction generally perpendicular to the base 11 and are slidable in a Ym-axis direction along side edges of the base 11, a beam 122 that is supported on upper ends of the beam supporters 121 and has a length in an Xm direction, a column 123 that is provided on the beam 122 and slidable in the Xm direction and has a guide in a Zm-axis direction, and a spindle 124 that is slidable in a Z-axis direction and holds the scanning probe 2 at a lower end.

Herein, a machine coordinate system is defined by an Xm-axis direction, the Ym-axis direction and the Zm-axis direction of the drive mechanism 12 (see FIG. 1).

An Xm-axis, a Ym-axis and a Zm-axis of the drive mechanism 12 are mutually perpendicular drive axes. The beam supporters 121, the column 123 and the spindle 124 constitute a slide member.

The drive sensor 13 includes a Ym-axis sensor 131 for detecting a movement of the beam supporter 121 in a Ym direction, an Xm-axis sensor 132 for detecting a movement of the column 123 in the Xm direction, and a Zm-axis sensor 133 for detecting a movement of the spindle 124 in the Zm direction. A detection result of the drive sensor 13 is output to the host computer 5 through the motion controller 4.

The scanning probe 2 includes a stylus 21 having a contact section (a measurement point) 22 at a tip end, and a support section 23 supporting a base end of the stylus 21 to be slidable within a certain area in an Xp direction, a Yp direction and a Zp direction.

The support section 23 includes a slide mechanism (not shown) having an xp slider, a yp slider and a zp slider movable in mutually orthogonal directions, and a probe sensor 24 (see FIG. 3) for detecting a displacement of the slide mechanism in each axis direction and outputting the detected displacement. The stylus 21 is supported by the slide mechanism to be slidabe within a certain area relative to the support section 23.

The probe sensor 24 includes an Xp direction sensor 241 for detecting a movement of the stylus 21 in the Xp direction, an Yp direction sensor 242 for detecting a movement of the stylus 21 in the Yp direction, and a Zp direction sensor 243 for detecting a movement of the stylus 21 in the Zp direction. A displacement of the stylus 21 detected by the probe sensor 24 is output to the host computer 5 through the motion controller 4.

Herein, a probe coordinate system is defined by the Xp direction, the Yp direction, and the Zp direction of the slide mechanism.

As shown in FIG. 1, a work coordinate system is defined with reference to a surface S to be measured of the workpiece W placed on the base 11. The work coordinate system is defined by an Xw direction and a Yw direction that are directions mutually orthogonal within a plane defined by three desired points on the surface S to be measured of the workpiece W, and a Zw direction that is a normal direction of the plane.

The operation unit 3 includes a swingable joystick (a manual operation member) 32 provided on an operation panel 31 for manually operating the movement of the scanning probe 2, a detection section (an inclination angle detector) 33 for detecting operations of the joystick 32, a coordinate system selection switch (a coordinate system selector) 34 for selecting a coordinate system when commanding a movement direction, and a fixing axis selection switch (an axis selector) 35 for selecting an axis on which the movement of the scanning probe 2 is fixed.

The joystick 32 includes a first lever 321 and a second lever 322, with base ends of the first lever 321 and the second lever 322 swingably supported by the operation panel 31 and free ends thereof swingable back and forth and left and right with a manual operation.

The detection section 33 includes an X-angle detector 331 for detecting a left/right inclination angle of the first lever 321 at a lower end of the first lever 321, a Y-angle detector 332 for detecting a back/forth inclination angle of the first lever 321 at the lower end of the first lever 321, and a Z-angle detector 333 for detecting a back/forth inclination angle of the second lever 322 at the lower end of the second lever 322. The detection section 33 outputs a detection signal to the motion controller 4.

The coordinate system selection switch 34 switches and selects the machine coordinate system and the work coordinate system with a press operation.

The fixing axis selection switch 35 has an x-axis fixing switch 351, a y-axis fixing switch 352 and a z-axis fixing switch 353, and prohibits a movement of the scanning probe 2 along a direction of a selected axis. For example, when the x-axis fixing switch 351 is selected, a movement direction of the scanning probe 2 is restricted within a YZ-plane. Note that directions of the respective axes are dependent on the coordinate system (the machine coordinate system or the work coordinate system) selected by the coordinate system selection switch 34.

The motion controller 4 includes a counter section 41 for counting a drive distance of the coordinate measuring machine 1, a coordinate system setting section 42 for setting a coordinate system according to the operation of the operation unit 3 a moving vector commander (an instruction vector commander) 43 for commanding a moving direction and a moving speed of the scanning probe 2 according to the manual operation of the operation unit 3 a scanning vector commander 44 for commanding a scanning vector along the workpiece surface according to a command from the moving vector commander 43 and a command of a probe retraction direction from the host computer 5, and a drive control circuit (a drive controller) 45 for performing a drive control of the drive mechanism 12 according to the scanning vector commanded from the scanning vector commander 44.

The counter section 41 includes a drive counter 411 for counting a pulse signal output from the drive sensor 13 to measure the drive distance of the drive mechanism 12, and a probe counter 415 for counting a pulse signal output form the probe sensor 24 to measure a slid distance of the stylus 21 as a retraction. The drive counter 411 includes a Ym-axis counter 412 for counting an output from the Ym-axis sensor 131, an Xm-axis counter 413 for counting an output from the Xm-axis sensor 132, and a Zm-axis counter 414 for counting an output from the Zm-axis sensor 133. The probe counter 415 includes an Xp direction counter 416 for counting an output from the Xp direction sensor 241, a Yp direction counter 417 for counting an output from the Yp direction sensor 242, and a Zp direction counter 418 for counting an output from the Zp direction sensor 243.

Count values (xm, ym, zm) by the drive counter 411 and count values (xp, yp, zp) by the probe counter 415 are respectively output to the host computer 5.

The coordinate system setting section 42, in which coordinate axes of the machine coordinate system and the work coordinate system are set and input, switches and sets the machine coordinate system and the work coordinate system according to an input operation of the coordinate system selection switch 34. The coordinate system setting section 42 commands the switched and set coordinate system to the moving vector commander 43 and the scanning vector commander 44. Incidentally, the machine coordinate system is set at the factory whereas the work coordinate system is newly generated to correspond to a workpiece.

The moving vector commander 43 includes a moving direction unit vector commander (an instruction unit vector commander) 431 that commands a unit vector of a direction in which the scanning probe 2 moves according to input operations of the fixing axis selection switch 35 and the joystick 32, a moving speed commander (an instruction speed commander) 432 that commands a movement speed in the moving direction of the scanning probe 2 according to the input operation of the joystick 32, and a moving vector generator (an instruction vector generator) 433 that generates a moving vector (an instruction vector) for moving the scanning probe 2 in an instructed direction at an instructed speed based on the unit vector of the moving direction and the movement speed in the moving direction.

The scanning vector commander 44 includes a vector combining section 441 that combines a moving vector command from the moving vector commander 43 and a retraction vector command of a retraction direction from the host computer 5 and generates a scanning vector to have the scanning probe 2 scan along the workpiece surface, and a coordinate system converter 442 that performs a coordinate conversion to convert the scanning vector into a command on the machine coordinate system.

The host computer 5 includes a retraction vector commander (a relative vector commander) 51 that generates a retraction vector (a relative vector) for commanding a movement in a retraction direction relative to the workpiece W (a normal direction of the workpiece surface), a memory (a storage) 52 that stores a measurement condition and the like input by the input unit 6, a form analyzer 53 that analyzes a form of the workpiece W based on sampled coordinates of the contact section, a CPU (a Central Processing Unit) 54 that is provided with an computing unit and a storage (a ROM, a RAM) and is adapted to execute a predetermined program and to perform a data processing, and a bus 55 that interconnects the retraction vector commander 51, the memory 52, the form analyzer 53 and the CPU 54.

The retraction vector commander 51 includes a retraction direction unit vector calculator (a relative unit vector calculator) 511 that calculates a unit vector of a direction in which the contact section 22 retracts into the workpiece W, a retraction deviation calculator (a relative deviation calculator) 512 that constantly calculates a deviation of retraction relative to a preset reference retraction, and a retraction vector generator (a relative vector generator) 513 that generates a retraction vector for commanding a movement in the retraction direction using the retraction unit vector and the retraction deviation. The retraction vector commander 51 stores each axis direction of the probe coordinate system.

The measurement condition to be input in the memory 52 may be, for example, a pitch for sampling the coordinates of the contact section 22 during the scan (a sampling pitch), a distance that the contact section 22 retracts into the workpiece W (a reference position, a reference retraction) and the like.

[Surface Scan Measuring Method]

Figure 4:
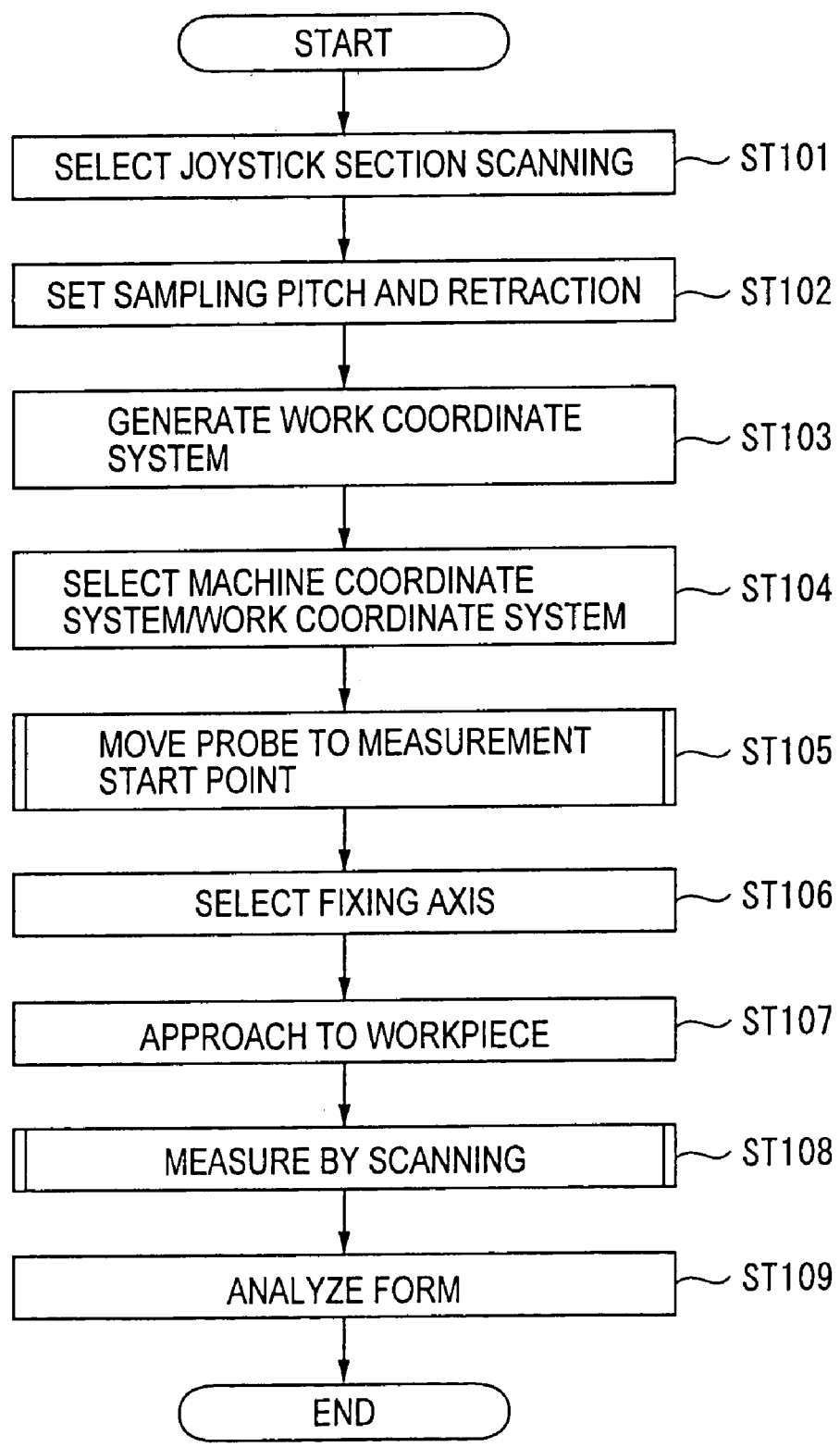
FIG. 4 is a flowchart showing steps of a surface scan measuring method according to the first embodiment.

A surface scan measuring method will be described with reference to a flowchart shown in FIG. 4. In the below description, the movement of the scanning probe 2 is restricted within a predetermined plane by the fixing axis selection switch 35 for measuring a cross-sectional profile of the workpiece W on this plane. Also, in the below description, a command from the operation unit 3 is executed on the work coordinate system.

Firstly, a measurement condition is set and input in advance of a measurement.

In ST101, a joystick section scanning mode is selected as a measurement mode by operating the input unit 6, and then the sampling pitch for sampling the coordinates of the contact section 22 and the reference retraction (the reference position) of the contact section 22 relative to the workpiece are set (ST102). The sampling pitch may be set in a range around 0.01 mm to 0.1 mm, for example. The reference retraction may be set around 0.5 mm, for example.

In ST103, a work coordinate system is generated. The work coordinate system is generated by measuring coordinates of three desired points on a surface to be measured of the workpiece W, and designating a normal direction of the plane defined by the three points as the Zw direction, and directions mutually orthogonal within the plane as the Xw direction and the Yw direction (see FIG. 1). The generated work coordinate system is stored in the coordinate system setting section 42.

In ST104, as a coordinate system which will be used when the operation unit 3 is manually operated, either the machine coordinate system or the work coordinate system is selected by the coordinate system selection switch 34. The selection by the coordinate system selection switch 34 is output to the coordinate system setting section 42. Then, the coordinate system setting section 42 selects either the machine coordinate system or the work coordinate system. In this embodiment, the work coordinate system is selected. The coordinate system selected by the coordinate system setting section 42 is output to the moving vector commander 43 and the scanning vector commander 44, so that the moving vector commander 43 and the scanning vector commander 44 perform a processing based on the selected coordinate system (the work coordinate system in this embodiment).

Figure 8:
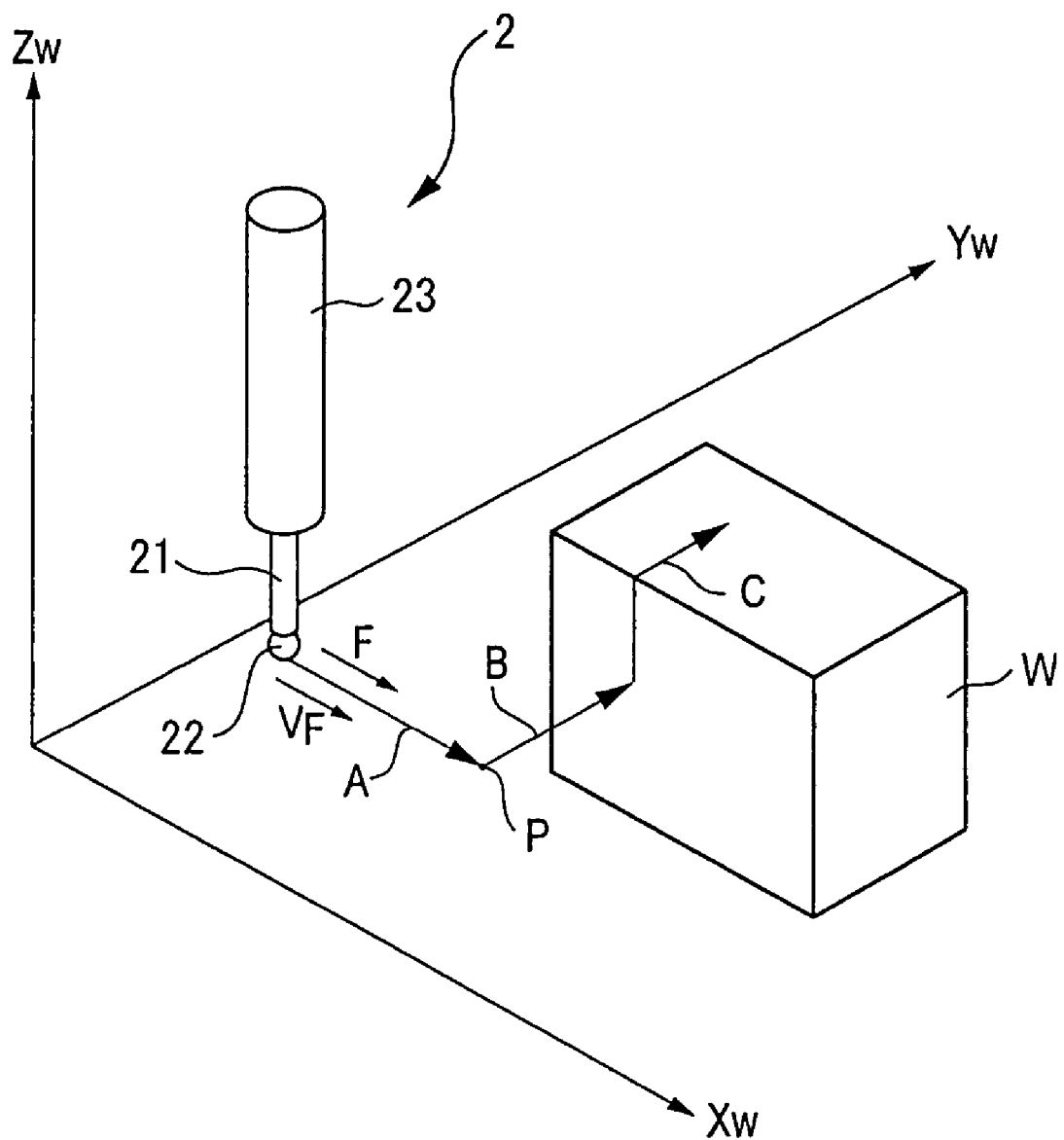
FIG. 8 is an illustration showing a path of a movement of the scanning probe.

Once the setting of the measurement condition is completed, in ST105, the scanning probe 2 is moved to a point P for starting a scan (an arrow A in FIG. 8). This operation is conducted by operating the joystick 32. Now, a process for moving the scanning probe 2 by manually operating the joystick 32 will be described with reference to a flowchart shown in FIG. 5.

In ST201, the the joystick 32 is operated. When the first lever 321 is inclined to the left or the right for instance, the X-angle detector 331 detects an inclination angle of the first lever 321 (ST202). A value detected by the X-angle detector 331 is output to the moving direction unit vector commander 431 and the moving speed commander 432. In other words, when the first lever 321 is inclined to the left or the right, a command instructing the X direction as the moving direction is output to the moving direction unit vector commander 431 and concurrently the degree of the inclination of the first lever 321 is output to the moving speed commander 432. Then, in ST203, the moving direction unit vector commander 431 generates a unit vector of the commanded moving direction within a predetermined limited processing time, for example within an instant. In this embodiment, a unit vector with size 1 in the Xw direction is generated in the work coordinate system. In ST204, the moving speed commander 432 generates a moving speed $V_S$ according to the degree of the inclination of the first lever 321.

In ST205, the moving vector generator 433 combines the unit vector from the moving direction unit vector commander 431 and the moving speed $V_S$ from the moving speed commander 432 to generate a moving vector command for moving the scanning probe 2, and outputs the moving vector command to the scanning vector commander 44 (ST205).

Herein, the moving vector $V_F$ is represented by a following formula using the unit vector F/|F| of the moving direction, the moving speed $V_S$, and a predetermined gain α.

$$\vec{V}_F = \alpha \cdot \frac{\vec{F}}{|\vec{F}|} \cdot V_S$$

This vector command, which is generated in the work coordinate system, should be converted into the machine coordinate system to be sent to the drive mechanism 12. Accordingly, in ST206, the coordinate system converter 442 converts the coordinate system of the moving vector command generated by the moving vector generator 433 into the machine coordinate system. Such coordinate conversion is performed by linearly mapping the vector with a primary conversion.

The moving vector command with the converted coordinates is output to the drive control circuit 45. Then the drive control circuit 45 generates a control signal for driving the drive mechanism 12 according to the moving vector command and applies the signal to the drive mechanism 12 (ST207). The drive mechanism 12 is driven to move the scanning probe 2 in parallel to the Xw-axis as shown by the arrow A in FIG. 8 (ST208).

The scanning probe 2 is thus moved to the measurement start point P by operating the joystick 32.

Once the scanning probe 2 is moved to the measurement start point P, the operation of the joystick 32 is stopped to suspend the movement of the scanning probe 2, and then the fixing axis for restricting the movement of the scanning probe 2 is selected (ST106). For example, for measuring a cross-sectional profile of the workpiece W by moving the scanning probe 2 within a plane parallel to the YZ-plane, the Xw-axis is fixed. The fixing axis is selected by the fixing axis selection switch 35 of the operation unit 3. The fixing axis selected by the fixing axis selection switch 35 is commanded to the moving direction unit vector commander 431. The moving direction unit vector commander 431 fixes the coordinates of the fixing axis to the current state.

In ST107, the scanning probe 2 is moved toward the workpiece W as shown by an arrow B in FIG. 8. Specifically, for example, the first lever 321 is inclined to the back or the forth so that the scanning probe 2 is moved in parallel to the Yw-axis. With this operation, the scanning probe 2 is moved by taking the above-described steps ST201 to ST208.

In ST108, when the contact section 22 reaches the workpiece surface, the scan is started (an arrow C in FIG. 8). Now, a process for moving the contact section 22 along the workpiece surface will be described with reference to a flowchart shown in FIG. 6.

Figure 5:
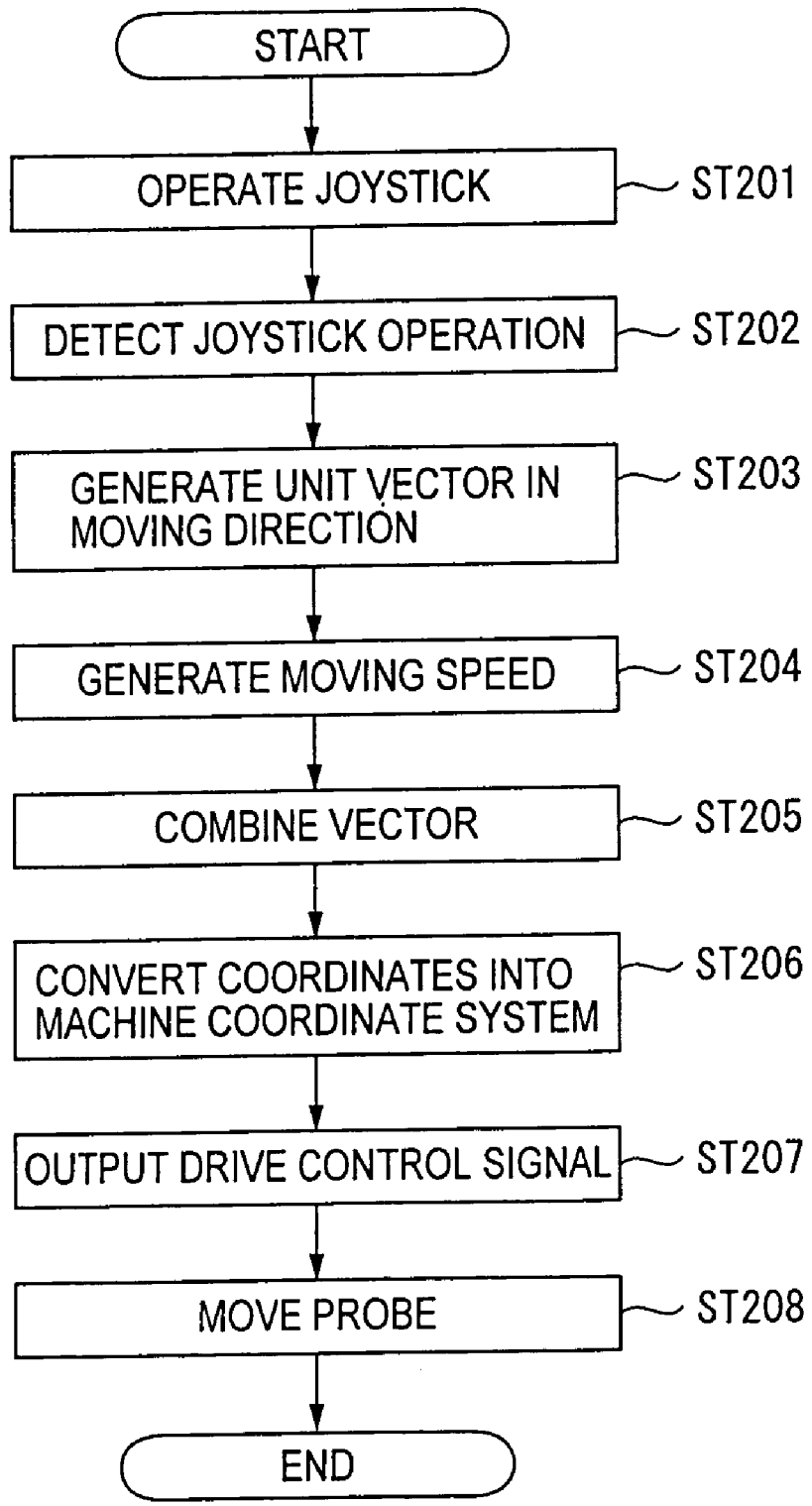
FIG. 5 is a flowchart showing steps of moving a scanning probe by operating a joystick according to the first embodiment.
Figure 6:
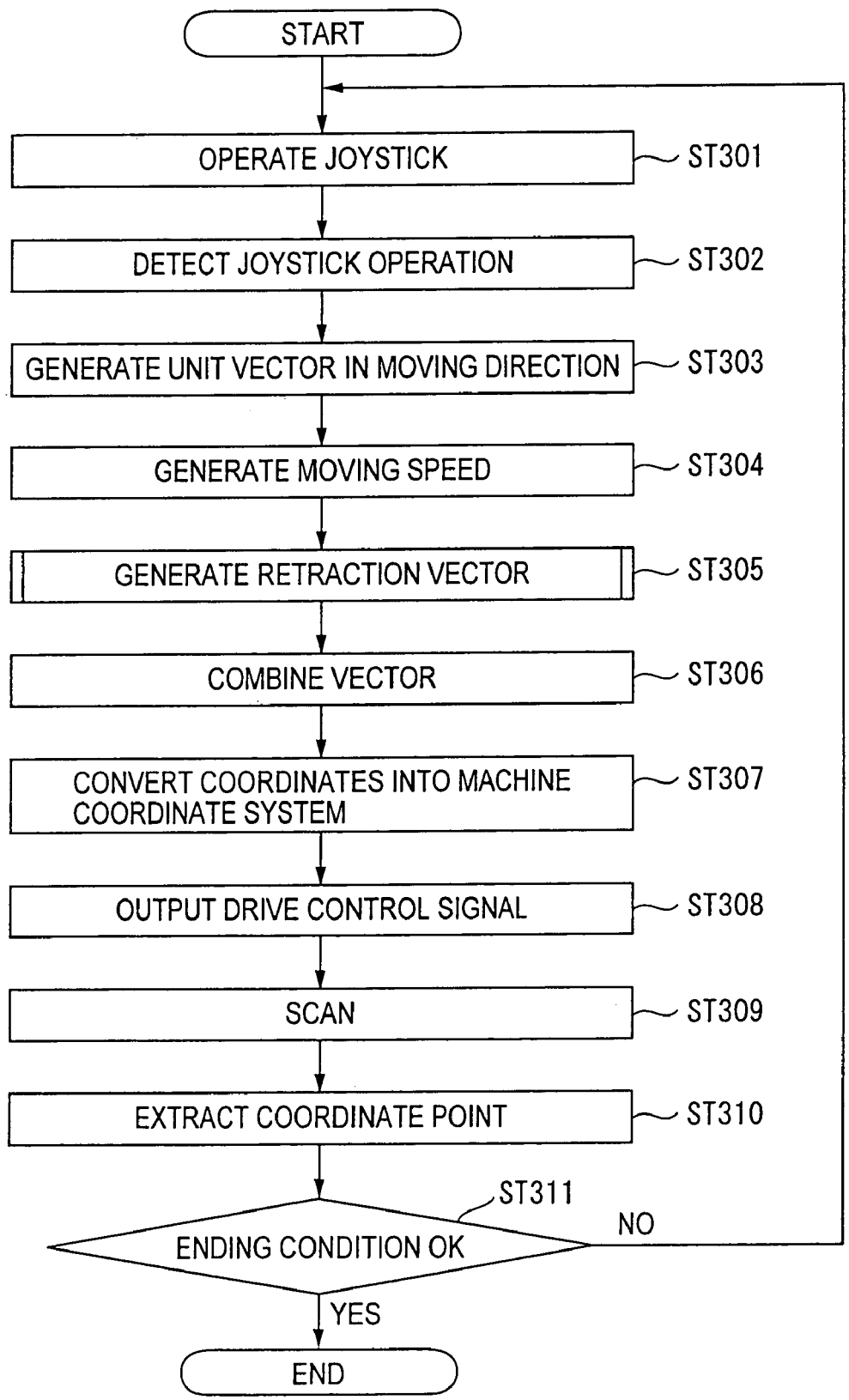
FIG. 6 is a flowchart showing steps of a scan according to the first embodiment.

Referring to FIG. 6, in ST301 to ST304 that are same as the above-described ST201 to ST204 in FIG. 5, the moving vector $V_F$ having the moving direction and the moving speed for moving the scanning probe 2 according to the inclination angle of the joystick 32 is output from the moving vector commander 43 to the scanning vector commander 44.

Figure 7:
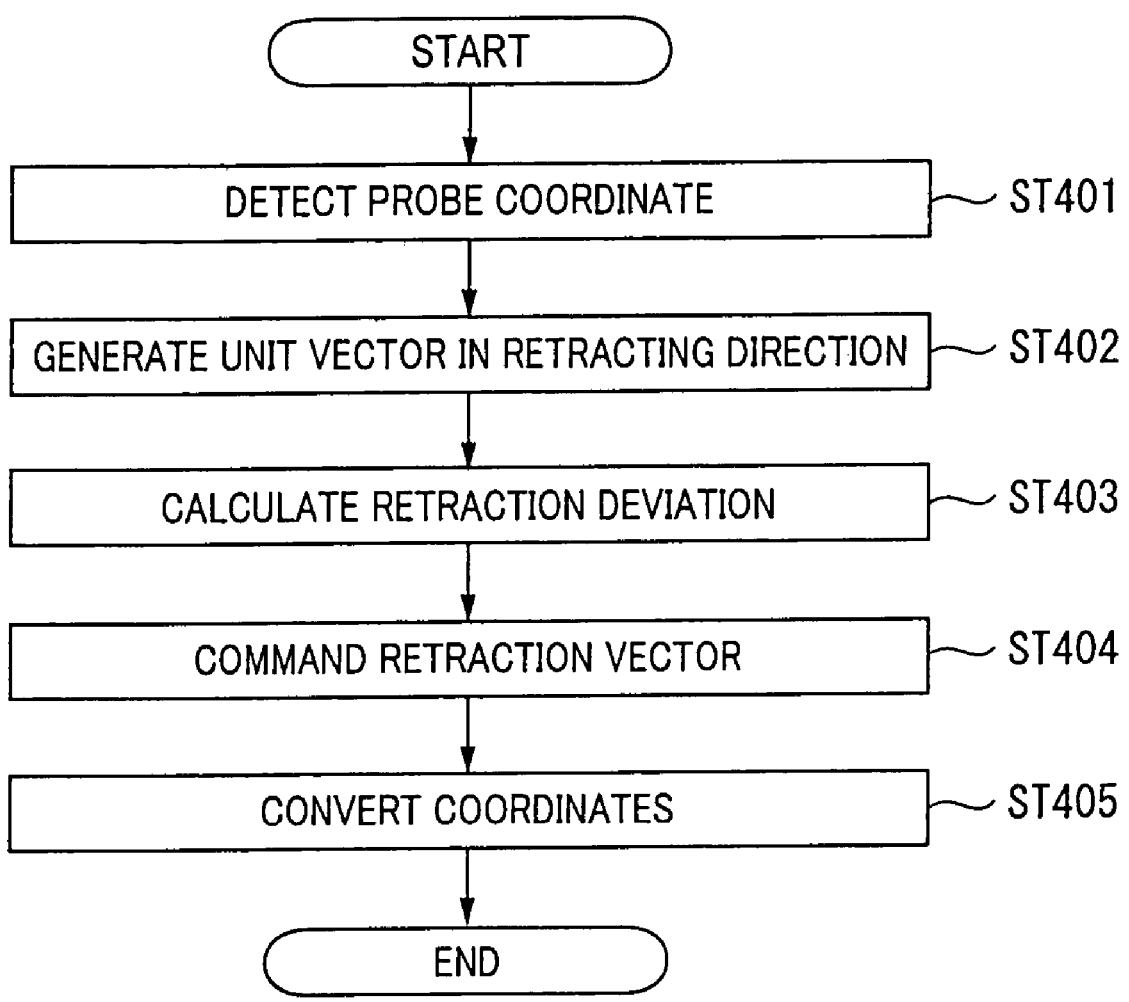
FIG. 7 is a flowchart showing steps of generating a retraction vector according to the first embodiment.

In ST303 and ST304, the command of the moving direction and the moving speed according to a command by the manual operation in ST301 is generated. In ST305, the retraction vector commander 51 generates a retraction vector for commanding a movement in a retraction direction relative to the workpiece W. Now, a process for generating the retraction vector will be described below with reference to a flowchart shown in FIG. 7.

In ST401, the probe sensor 24 detects a displacement of the stylus 21 as a retraction. The output from the probe sensor 24 is counted by the probe counter 415, and the count is output to the host computer 5. In ST402, the retraction direction unit vector calculator 511 calculates a retraction direction unit vector based on the count of the probe counter 415. Herein, when the count output from the probe counter 415 is $(x_p, y_p, z_p)$, the retraction direction unit vector is represented by a following formula.

$$\vec{n} = \left( \frac{x_P}{|\vec{P}_C|}, \frac{y_P}{|\vec{P}_C|}, \frac{z_P}{|\vec{P}_C|} \right), \quad |\vec{P}_C| = \sqrt{x_P^2 + y_P^2 + z_P^2}$$

In ST403, the retraction deviation calculator 512 calculates a retraction deviation of the contact section 22 relative to a reference retraction Ps based on the count of the probe counter 415. The retraction deviation d is represented by a following formula.

$$d = |\vec{P}_C| - |\vec{P}_S|$$

$|\vec{P}_S|$ representing the reference retraction

The retraction vector generator 513 generates the retraction vector $V_P$ using a predetermined gain β and outputs the retraction vector $V_P$ to the scanning vector commander 44 (ST404).

$$\vec{V}_P = \beta \cdot \alpha \cdot \vec{n}$$

Since the retraction vector is generated in the probe coordinate system, the coordinate system converter 422 converts the coordinate system of the retraction vector $V_P$ into the work coordinate system.

When the moving vector and the retraction vector are thus generated, in ST306 (FIG. 6), the vector combining section 441 combines the moving vector from the moving vector commander 43 and the retraction vector from the retraction vector commander 51 to generate a scanning vector Vw.

$$\vec{V}_W = \vec{V}_F + \vec{V}_P{}'$$

$\vec{V}_P{}'$ representing the vector after converting $\vec{V}_P$ into the work coordinate system In ST307, the coordinate system converter 442 converts the coordinate system of the combined scanning vector Vw into the machine coordinate system.

When a conversion matrix from the work coordinate system to the machine coordinate system is [A] and the scanning vector converted into the machine coordinate system is Vw', a conversion formula is represented by a following formula.

$$\vec{V}_W 40 = [A] \vec{V}_W$$

A control signal from the drive control circuit 45 is applied to the drive mechanism 12 according to the scanning vector Vw' converted into the machine coordinate system (ST308), and the contact section 22 scans along the workpiece surface (ST309).

Output values from the drive counter 411 and the probe counter 415 are output to the host computer 5 at the preset sampling pitch during the scan, so that the coordinates of the contact section 22 are sampled (ST310).

In ST311, if an ending condition is satisfied, the scan will end. As the ending condition, areas to be measured by scanning may be set and input in advance so that the scan will end when the scan of all these areas to be measured by scanning is completed. Alternatively, the ending condition of the scan may be satisfied when the scanning probe 2 returns to the measurement stat point P. Further, the ending condition may be satisfied by when the operator inputs an ending command.

In ST311, if the ending condition is not satisfied, a command for moving the scanning probe 2 is given by the operation of the joystick 32 back in ST301.

In this step, by changing the degree of inclination of the joystick 32, the moving speed command output from the moving speed commander 432 is changed. Accordingly, the moving speed of the scanning probe 2 is changed.

Also, by changing the direction of the inclination of the joystick 32, the moving direction of the scanning probe 2 can be changed.

Upon the completion of the scan, the form analyzer 53 analyzes the contour of the workpiece W based on the sampled coordinates of the contact section 22. In the form analyzer 53, the coordinate of the contact section 22 is calculated after the coordinate conversion of the coordinates obtained in the probe coordinate system or the machine coordinate system.

According to the first embodiment with such configuration, the following advantages can be obtained.

(1) Since the joystick 32 is provided, the operator can input a desired moving direction and a desired moving speed by manually operating the joystick 32, and can move the scanning probe 2 in the desired moving direction and the desired moving speed. Accordingly, since there is no need to input the profile data in advance of starting the measurement, the measurement can be easily started. Also, since a measurement can be smoothly followed by another measurement, the measurement can be immediately started even when the workpiece is replaced. Consequently, the measurement can be easily performed without troublesome work, thereby considerably shortening the time required for the measurement. Since, for example, the movement of the scanning probe 2 is suspended by giving the joystick 32 zero degree of inclination angle to set the speed command at zero, the timing to start or to suspend the measurement can be freely adjusted.

(2) Since the moving speed can be adjusted by the joystick 32 as desired, the measurement can be performed with a scan speed corresponding to the workpiece, for example, by instructing a faster speed in a scan measurement of a linear area, and by instructing a slower speed in a scan measurement of a rounded area. Although a rate might be limited to a slow speed if the scan speed is preset, the time required for the measurement can be adjusted by the speed adjustment by the joystick 32.

(3) While the moving direction and speed can be adjusted by the joystick 32, the movement in the retraction direction is automatically controlled by the retraction vector commander 51 based on the value detected by the probe sensor 24. Accordingly, even when the scanning probe 2 is manually operated, the scan can be performed while keeping the contact section 22 on the reference position without requiring neither a special skill nor a fine operation. The retraction of the scanning probe 2 into the workpiece W is slight and it is impossible to manually control the retraction. However, since the command of the retraction direction out of the commands for controlling the movement of the scanning probe 2 is automatically controlled by separating from the manual control, it is possible to manually control other commands (the moving direction and the moving speed).

(4) The machine coordinate system defined by the drive axes of the drive mechanism 12 and the work coordinate system defined by the workpiece are set in the coordinate system setting section 42, and the coordinate system can be selected by the coordinate system selection switch 34. Accordingly, when the operator instructs the moving direction using the joystick 32, it is easy for the operator to intuitively recognize the direction based on the work coordinate system.

(5) The fixing axis selection switch 35 is provided so that movement of the scanning probe 2 along the selected axis can be restricted by selecting the axis fixing switches 351 to 353. Accordingly, since the scanning probe 2 moves only within a plane perpendicular to the selected axis, the cross-sectional profile on this plane can be scanned. Although it is difficult to accurately instruct one direction by manually operating the joystick 32, the movement of the scanning probe 2 along the selected axis can be restricted, and the cross-sectional profile within the plane can be accurately measured.

(Modification 1)

The following is the description of a modification 1 of the present invention. Although the general configuration of the modification 1 is almost the same as that of the first embodiment, it is characterized in that the scanning probe 2 is moved along a surface S to be measured without selecting an axis restricting the movement of the scanning probe 2.

That is, when a scan is performed, after moving the scanning probe 2 to the measurement start point P (ST105), the scanning probe 2 is approached to the workpiece W (ST107) and then the scan measurement is performed (ST108) skipping the step (ST106) for selecting the axis with the use of the fixing axis selection switch 35.

Figure 9:
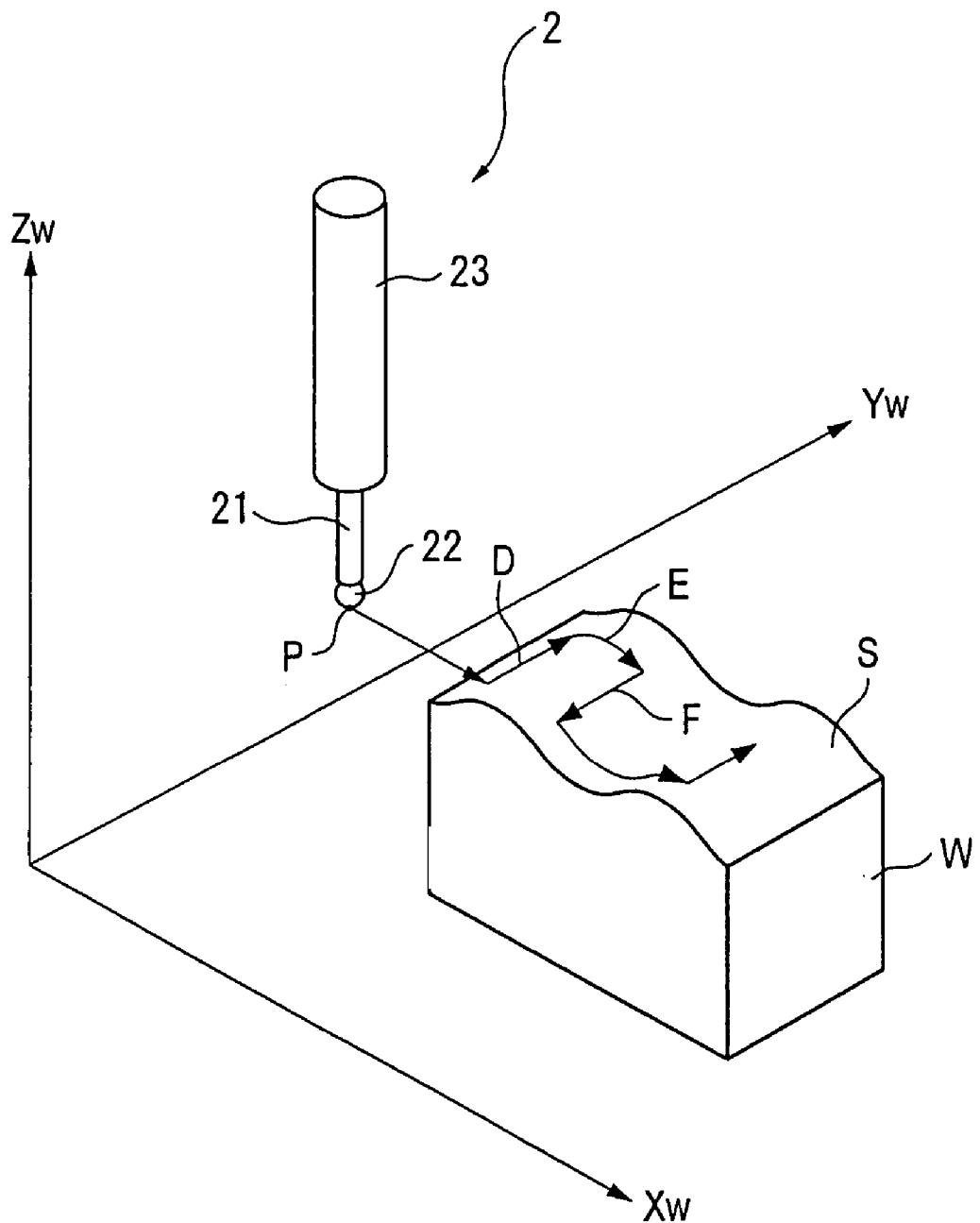
FIG. 9 is an illustration showing a modification 1 of the present invention for scanning along a surface of a workpiece.

An example of a path made by such scan is shown in FIG. 9. In FIG. 9, after the contact section 22 abuts on the workpiece surface, the scanning probe 2 is moved along the Yw-axis by manually operating the joystick 32 (an arrow D in FIG. 9). After the scanning probe 2 is moved a predetermined distance in the Yw direction, the scanning probe 2 is moved along the Xw-axis (an arrow E). Then, the scanning probe 2 is moved along the Yw-axis again (an arrow F). The scanning probe 2 is thus moved toward a desired measurement area on the surface S to be measured of the workpiece surface by the joystick 32. Incidentally, the retraction direction perpendicular to the workpiece surface is automatically controlled by the retraction vector commander 51 in the manner described in the first embodiment.

With this configuration, the surface S to be measured of the workpiece W can be continuously measured. In this process, immediately after a measurement along a line, a measurement along another line can be performed. Consequently, since the measurement is not interrupted, the time required for the measurement can be shortened. Further, there is no need to input the form data and the like of the surface to be measured, the scan measurement can be easily performed.

(Modification 2)

The following is the description of a modification 2 of the present invention. The general configuration of the modification 2 is almost the same as that of the embodiment 1, the modification 2 is characterized in that the moving direction is determined by a predetermined route set in advance whereas the moving speed is instructed by the joystick 32.

For enabling such function, a profile data of a workpiece and a predetermined route for a scan measurement are set and input in the memory 52 in advance. The predetermined route may be a route for scanning an inner circumference of a cylinder or a route for scanning a groove of a thread.

The moving direction vector commander 431 reads out the predetermined route from the memory 52 and constantly commands a unit vector of a tangent line direction of the predetermined route. The moving direction unit vector commander 431, without receiving the instruction of the moving direction from the joystick 32, calculates a unit vector of the moving direction only in accordance with the input data in the memory 52. That is, the moving direction of the scanning probe 2 and the retraction direction into the workpiece surface are controlled by the commands of the moving direction unit vector commander 431 and the retraction vector commander 51.

With this configuration, when the joystick 32 is inclined, the detection section 33 detects the degree of the inclination angle, and the moving speed commander 432 commands the moving speed depending on the degree of the inclination angle. Then, in the scanning vector commander 44, a scanning vector is combined according to a command automatically generated by the moving direction unit vector commander 431 and the retraction vector commander 51 as for the direction, and according to an instruction by the joystick 32 as for the moving speed. In response to the command of the scanning vector, the drive control circuit 45 drives the drive mechanism 12, so that the scanning probe 2 scans on the predetermined route.

According to such configuration, when a predetermined scan route is input in advance, even a complicated scan route can be scanned according to the automatically generated direction command. Since the speed can be instructed by the joystick 32, the scan measurement can be performed at an appropriate speed adjusted by the operator. Consequently, the measurement time can be shortened. Further, since the speed command is set to zero by giving the joystick 32 zero degree of inclination angle during the measurement, the timing of the measurement to, for example, stop the scan, is flexibly adjustable.

The scan measuring method and the scan measuring instrument of the present invention are not limited to the above-described embodiments, but include various modifications as long as the object of the present invention can be achieved.

Figure 10:
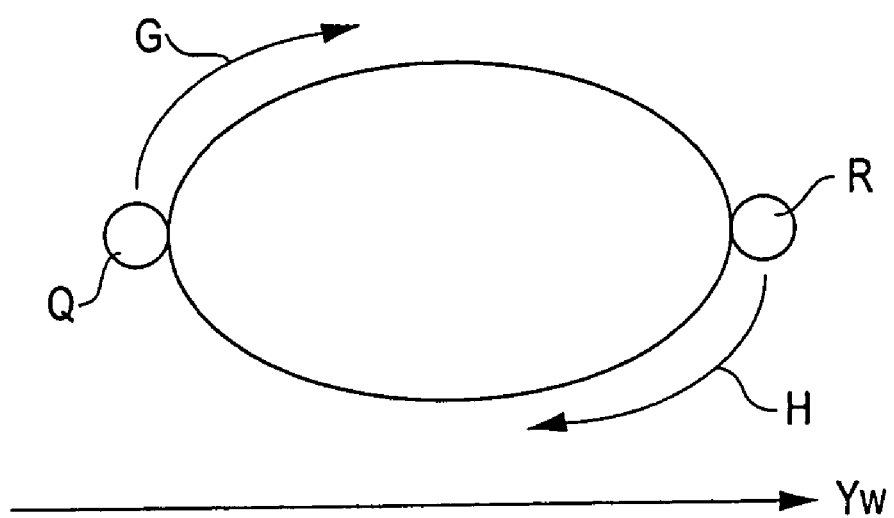
FIG. 10 is an illustration showing a scanning probe moving along a contour of the workpiece.

Although the moving direction is instructed by the inclination direction of the levers 321 and 322, the scanning probe 2 may move along the contour while the levers 321 and 322 are kept inclined in the measurement of the cross-sectional profile of the workpiece W. For example, when the lever 321 is inclined in the +Y direction, the contact section 22 moves toward the +Y direction (an arrow G) as shown in FIG. 10. Herein, while the lever 321 is kept inclined in the +Y direction, the scanning probe 2 moves in the -Y direction without stopping (an arrow H) after moving half round.

Although the scanning probe 2 moves with the contact section 22 kept in contact with the workpiece surface in the above description, the scanning probe 2 may be a non-contact type scanning probe without limiting to a contact type one. For instance, the stylus 21 may have an electrode sensor at the tip end for detecting a capacitance so that the workpiece surface is detected by detecting the capacitance changing in accordance with the distance from the workpiece surface.

Alternatively, the scanning probe 2 may be a microscope known as a STM (Scanning Tunneling Microscopy) or an AFM (Atomic Force Microscopy) capable of measuring a minute form.

In the scan measurement, although the work coordinate system is selected in the above embodiment, the machine coordinate system may be selected.

Although the motion controller 4 and the host computer 5 include elements having a hardware such as a logical element for providing each function in the above embodiment, the function may be provided by a predetermined program installed in a computer having a CPU (a Central Processing Unit) and a memory (a storage). In the configuration having the CPU and the memory for serving as a computer, a predetermined surface scan measuring program is installed in the memory through a communication system such as the Internet or a recording medium such as a CD-ROM, a memory card and the like, so that each function may be provided by operating the CPU using the installed program. For installing the program, the memory card and the CD-ROM and the like may be directly inserted, or alternatively a reader device for reading the recording medium may be externally connected. The program may be supplied and installed through a communication line such as a LAN cable and a telephone line, or may be wirelessly supplied and installed.

What is claimed is:

1. A surface scan measuring instrument comprising:
    a scanning probe that has a measurement point for approaching or contacting a workpiece surface and a detection sensor for detecting a relative position of the measurement point and the workpiece surface along a normal direction of the workpiece surface, the scanning probe scanning the workpiece surface while keeping the relative position of the measurement point and the workpiece at a preset reference position;
    a moving unit for moving the scanning probe;
    an operation unit that has a manual operation member for instructing an input of a desired direction and a desired size with a manual operation;
    an instruction vector commander that generates an instruction vector having the direction and the size instructed by the manual operation member within a predetermined limited processing time from the input instruction;
    a relative vector commander that automatically generates a relative vector having a size of a deviation of the relative position of the measurement point and the workpiece surface relative to the reference position and a direction of the normal direction of the workpiece surface based on a value detected by the detection sensor;
    a scanning vector commander that generates a scanning vector by combining the instruction vector and the relative vector; and
    a drive controller for controlling a drive of the moving unit according to the scanning vector.

2. The surface scan measuring instrument according to claim 1,
    wherein the moving unit has drive axes in mutually orthogonal three directions and slide members respectively provided on the drive axes and slidable along the drive axes,
    wherein the surface scan measuring instrument has a coordinate system setting section in which a machine coordinate system having an Xm-axis, a Ym-axis and a Zm-axis in directions of the respective drive axes, and a work coordinate system having an Xw-axis, a Yw-axis mutually orthogonal within a plane defined by a desired surface of the workpiece and a Zw-axis perpendicular to the plane are set,
    wherein the operation unit has a coordinate system selector for selecting either one of the machine coordinate system or the work coordinate system with a manual operation,
    wherein an instruction direction of the manual operation member is defined according to the either one of the machine coordinate system or the work coordinate system selected by the coordinate system selector while the instruction vector commander generates the instruction vector according to the selected coordinate system, and wherein the scanning vector commander includes a coordinate system converter for converting the machine coordinate system and the work coordinate system into one another.

3. The surface scan measuring instrument according to claim 2, wherein the operation unit has an axis selector for selecting any one of three axes of either the machine coordinate system or the work coordinate system with a manual operation, and wherein the instruction vector commander generates the instruction vector within a plane perpendicular to the axis selected by the axis selector while fixing coordinates of the selected axis.

4. The surface scan measuring instrument according to claim 1, wherein the manual operation unit has a swingable joystick, and wherein the operation unit includes an inclination angle detector for detecting an inclination angle and an inclination direction of the joystick.

5. A surface scan measuring instrument comprising:

a scanning probe that has a measurement point for approaching or contacting a workpiece surface and a detection sensor for detecting a relative position of the measurement point and the workpiece surface along a normal direction of the workpiece surface, the scanning probe scanning the workpiece surface while keeping the relative position of the measurement point and the workpiece at a preset reference position;

a moving unit for moving the scanning probe;

an operation unit that has a manual operation member for instructing an input of a desired size with a manual operation;

a storage for storing a predetermined route to be scanned in advance;

an instruction vector commander that generates an instruction vector having the size instructed by the manual operation member and a direction along the predetermined route;

a relative vector commander that automatically generates a relative vector having a size of a deviation of the relative position of the measurement point and the workpiece surface relative to the reference position and a direction of the normal direction of the workpiece surface based on a value detected by the detection sensor;

a scanning vector commander that generates a scanning vector by combining the instruction vector and the relative vector; and a drive controller for controlling a drive of the moving unit according to the scanning vector.

6. A surface scan measuring method for performing a scan measurement of a workpiece surface by moving a scanning probe by a moving unit, wherein the scanning probe has a measurement point for approaching or contacting a workpiece surface and a detection sensor for detecting a relative position of the measurement point and the workpiece surface along a normal direction of the workpiece surface, the scanning probe scanning the workpiece surface while keeping the relative position of the measurement point and the workpiece at a preset reference position, the surface scan measuring method comprising:

a manual operation step of instructing an input of a desired direction and a desired size with a manual operation;

an instruction vector commanding step of generating an instruction vector having the direction and the size instructed by the manual operation step within a predetermined limited processing time from the input instruction;

a relative vector commanding step of automatically generating a relative vector having a size of a deviation of the relative position of the measurement point and the workpiece surface relative to the reference position and a direction of the normal direction of the workpiece surface based on a value detected by the detection sensor;

a scanning vector commanding step of generating a scanning vector by combining the instruction vector and the relative vector; and a drive controlling step of controlling a drive of the moving unit according to the scanning vector.

7. A computer-readable surface scan measuring program for operating a computer installed in a surface scan measuring instrument comprising: a scanning probe that has a measurement point for approaching or contacting a workpiece surface and a detection sensor for detecting a relative position of the measurement point and the workpiece surface along a normal direction of the workpiece surface, the scanning probe scanning the workpiece surface while keeping the relative position of the measurement point and the workpiece at a preset reference position; a moving unit for moving the scanning probe; and an operation unit that has an manual operation member for instructing an input of a desired direction and a desired size with a manual operation, the surface scan measuring program operating the computer as:

an instruction vector commander that generates an instruction vector having the direction and the size instructed by the manual operation member within a predetermined limited processing time from the input instruction;

a relative vector commander that automatically generates a relative vector having a size of a deviation of the relative position of the measurement point and the workpiece surface relative to the reference position and a direction of the normal direction of the workpiece surface based on a value detected by the detection sensor;

a scanning vector commander that generates a scanning vector by combining the instruction vector and the relative vector; and a drive controller for controlling a drive of the moving unit according to the scanning vector.

8. A computer-readable recording medium storing a computer-readable surface scan measuring program for operating a computer installed in a surface scan measuring instrument comprising: a scanning probe that has a measurement point for approaching or contacting a workpiece surface and a detection sensor for detecting a relative position of the measurement point and the workpiece surface along a normal direction of the workpiece surface, the scanning probe scanning the workpiece surface while keeping the relative position of the measurement point and the workpiece at a preset reference position; a moving unit for moving the scanning probe; and an operation unit that has an manual operation member for instructing an input of a desired direction and a desired size with a manual operation, the surface scan measuring program operating the computer as:

an instruction vector commander that generates an instruction vector having the direction and the size instructed by the manual operation member within a predetermined limited processing time from the input instruction;

a relative vector commander that automatically generates a relative vector having a size of a deviation of the relative position of the measurement point and the workpiece surface relative to the reference position and a direction of the normal direction of the workpiece surface based on a value detected by the detection sensor;

a scanning vector commander that generates a scanning vector by combining the instruction vector and the relative vector; and a drive controller for controlling a drive of the moving unit according to the scanning vector.

* * * * *